UNITED STATES PATENT OFFICE.

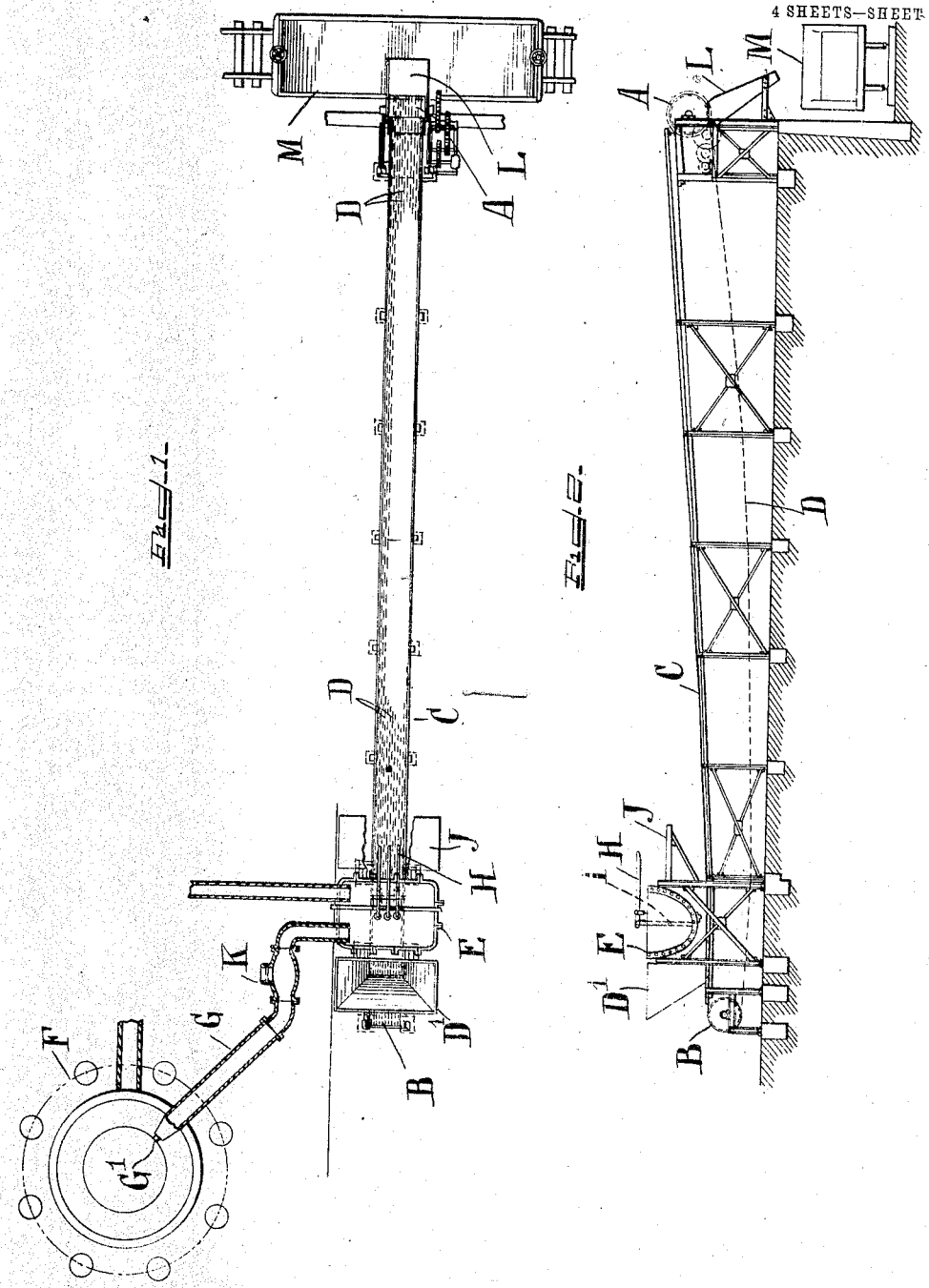

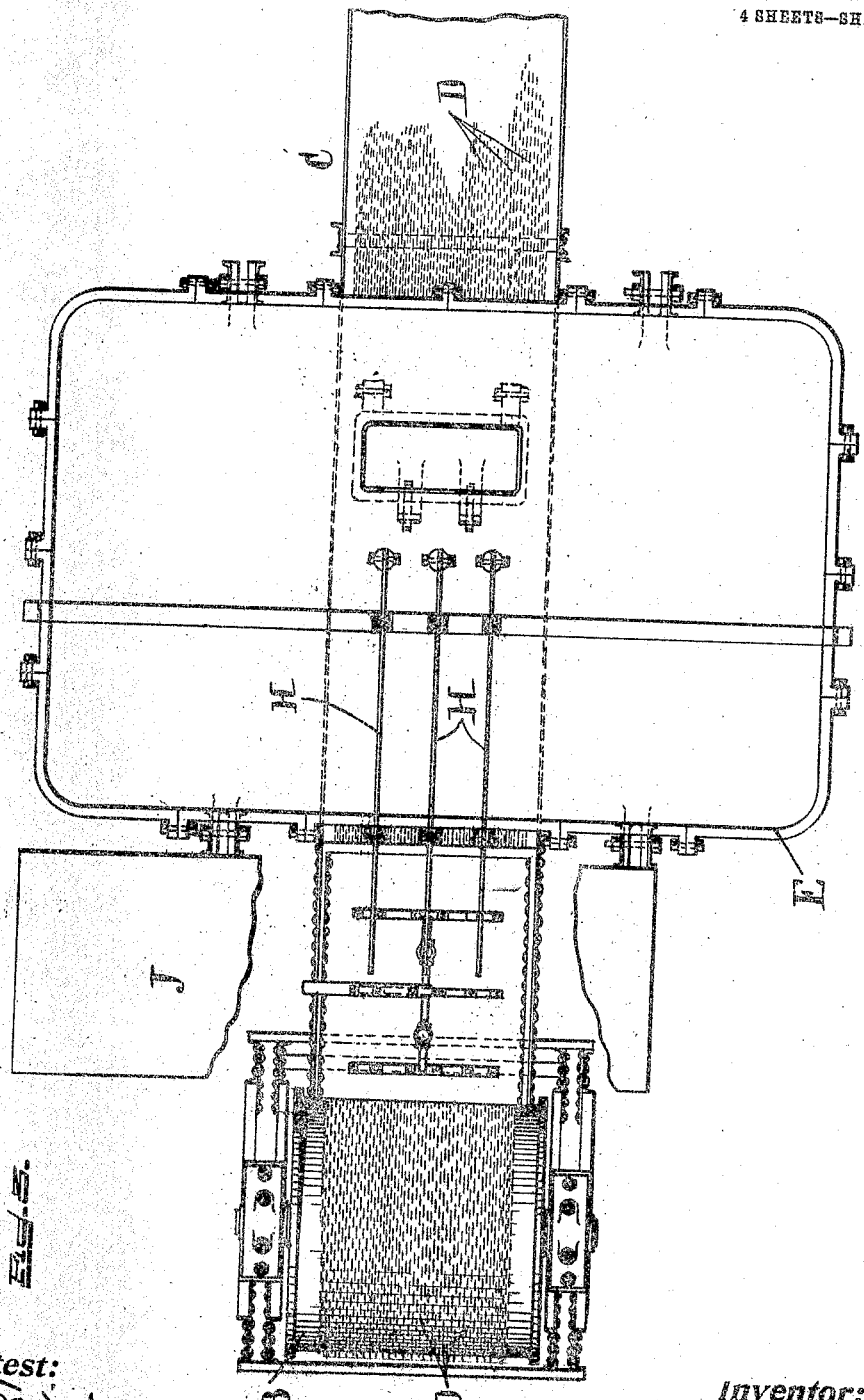

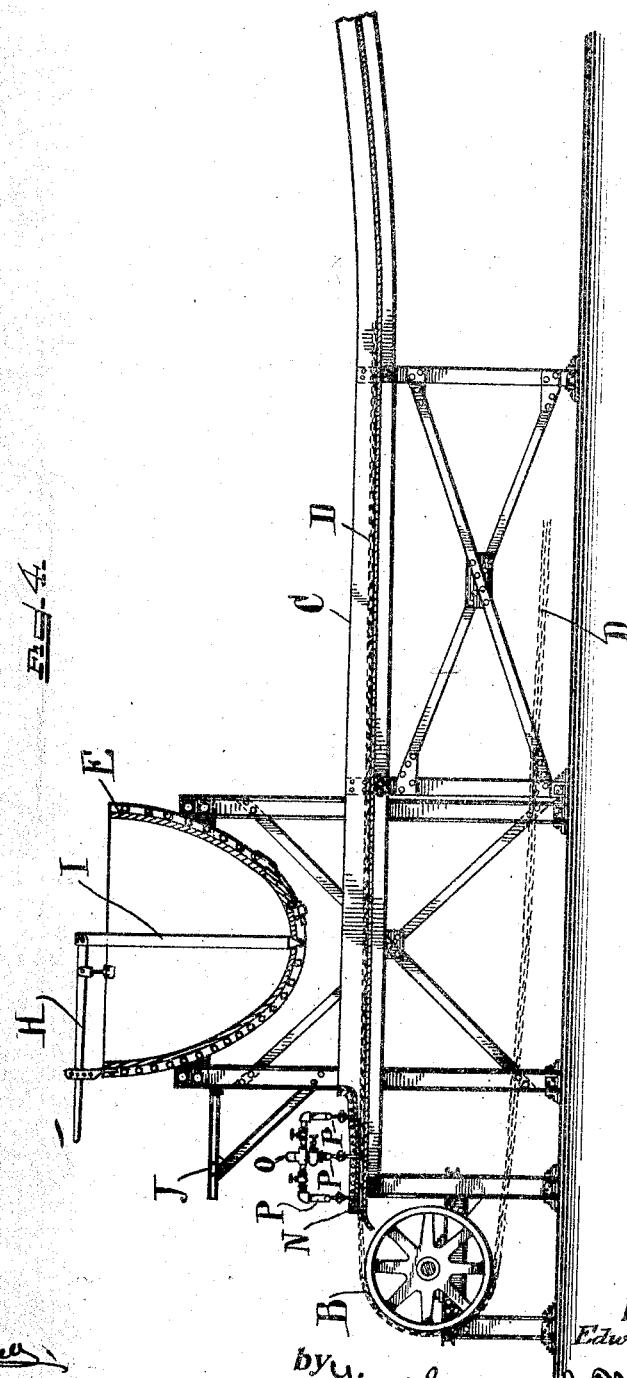

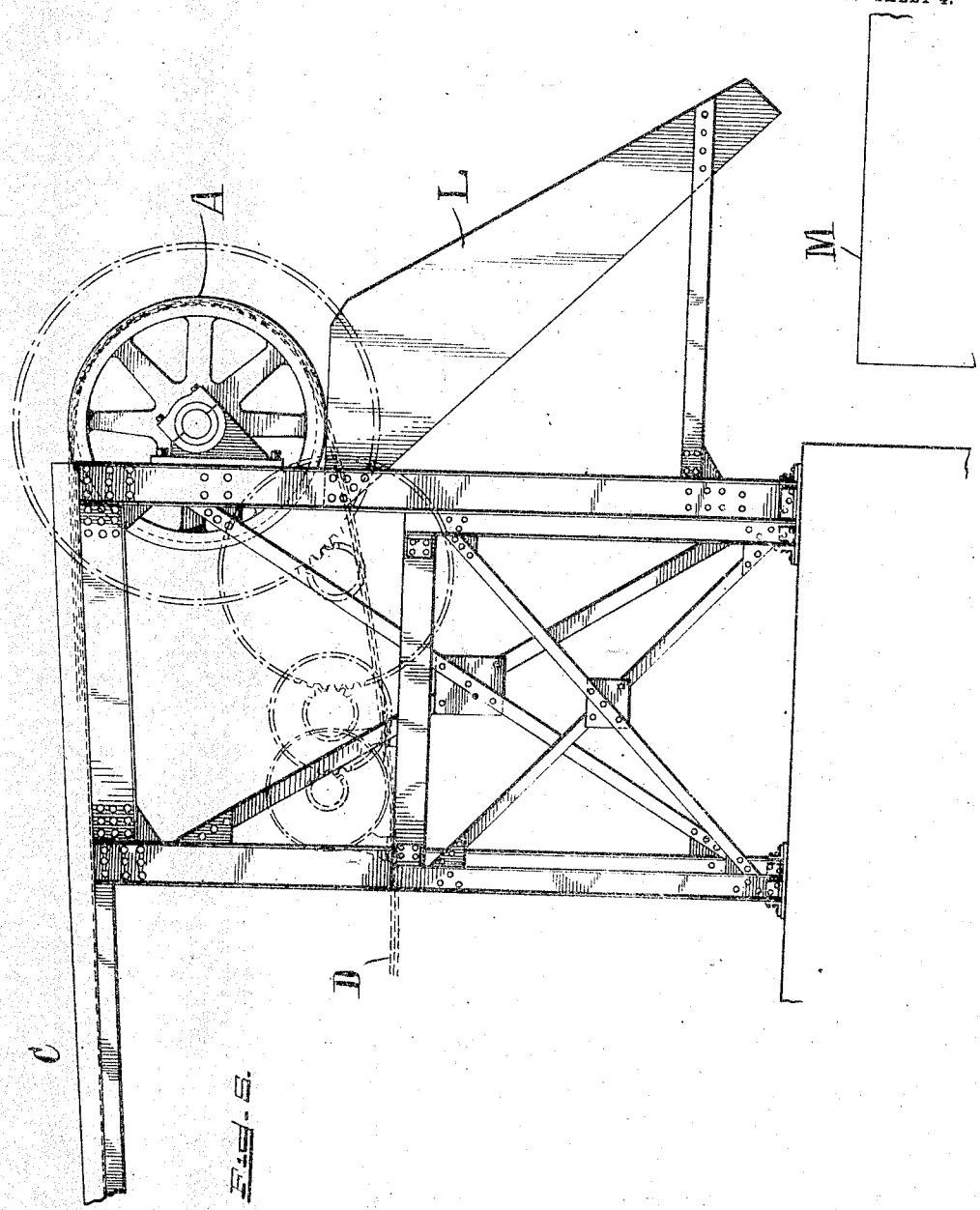

EDWARD A. UEHLING, OF PASSAIC, NEW JERSEY.

MACHINERY FOR CONVEYING BLAST-FURNACE SLAG.

No. 923,218.  Specification of Letters Patent.  Patented June 1, 1909.

Application filed June 30, 1908. Serial No. 441,204.

*To all whom it may concern:*

Be it known that I, EDWARD A. UEHLING, mechanical engineer, citizen of the United States, and a resident of Passaic, in the State of New Jersey, have invented certain new and useful Improvements in Machinery for Conveying Blast-Furnace Slag, of which the following is a specification, illustrated by the accompanying drawings.

The present mode of operation in blast furnaces is to run off the slag into a movable receptacle such as a steel or clay lined car, and when the car is filled, to run it to some convenient location considerably removed from the furnace proper and discharge the contents of the car on a dump. This has been the mode of operation that has been carried on in connection with most blast furnaces in this country for a number of years, and the result has been that furnaces that have been in blast for a considerable period of time, have accumulated vast slag dumps, which have been a very great and serious annoyance to the furnace management, as these dumps have occupied valuable space and are absolutely worthless in themselves, and have and are increasing in size from day to day. Recently, however, the problem of converting the waste products of blast furnace into marketable form, has been receiving very considerable attention not only in this country, but also abroad, and running slag into water which converts it into a pulverulent form suitable to make cement has proven to be one of the best methods to utilize this waste material. How ever, only a small per cent. of the slag produced can be profitably marketed in this way.

This invention relates to improvements in machines for conveying the waste blast furnace slags and similar materials, receiving them in a molten condition and delivering them in a solidified form in which form they may be readily disposed of, either by transporting them to the waste dump when there is no remunerative demand for slag products, or they may be utilized directly for railroad ballasting and road making, or by further treatment for various and special purposes.

The object of this invention is to handle the slag in an economical manner and to put the slag at the same time into such form that it may be used for ballasting of railroad track, road making; or by means of crushers, screens, &c., to reduce it to a marketable form that will make it a source of income instead of expense as at present.

In the drawings Figure 1 shows a plan view of the blast furnace and the means of connecting it with slag conveying apparatus. Fig. 2 shows the slag conveying apparatus in side elevation. Fig. 3 is an enlarged plan view of the mechanism shown in Fig. 2; and Figs. 4 and 5 are enlarged elevations of the two ends of the conveying apparatus, Fig. 4 in a slightly modified form from that shown in the previous figures.

The apparatus consists essentially of a frame carrying a drum A driven by a motor and apportionate gear. The motor and gear are shown at the right hand end of Figs. 1 and 2 diagraphically. The left hand end of the apparatus is the drum B, and over these two drums and supported between them in the trough C lies a plurality of chains D. These chains are arranged in an endless band extending from one drum to the other and follow a catenary curve between the two drums. On the lower end of the frame is placed the hopper D, and the reservoir E; the hopper D' having an opening at its bottom just equal to the width of the chains. The reservoir E is provided with a number of holes in the bottom which are closed by the means of the stoppers I manipulated by levers H. On the opposite side of the reservoir E is the platform J for the convenience of the operator who controls the levers H. The reservoir E is connected with the blast furnace F, as shown in Fig. 1 by means of the runner G, which is provided with a catch basin K, and by this means a direct connection is made to the cinder notch G' in the furnace F. On the opposite end of the frame is provided a spout L by means of which the slag after passing over the drum A is directed into the car M or other receptacle located beneath it. If it may be desired to have the material of a higher grade and of a finer kind, the solidified and cooled slag may be passed through crushers and over screens, instead of going directly into the railroad car as shown.

The operation of this device is as follows: The cinder notch G' being opened the slag flows through the runner G into the reservoir E, and in case any metal issues at the same time from the blast furnace, it will be caught in, and can be recovered from, the catch basin K, so as to prevent it being wasted. The hopper D' having previously been filled with either finely pulverized slag, ashes or similar material (means for automatically keeping the reservoir filled being the subject matter of a separate application), the motor is started as soon as a sufficient quantity of slag has flowed into the reservoir E. As the conveying band passes beneath the opening in the bottom of hopper D, it will be covered with a layer of the fine material which is contained within it. The operator standing upon the platform J will then actuate the levers H and the molten slag will then flow upon the band of chains, which, as has been previously stated, are covered with the pulverized material from the hopper D', regulating the flow of slag out of the reservoir E by means of actuating the lever arm H and regulating the speed of the motor by means of which the chains are actuated, the entire protected surface of the chain band will be covered with a layer of slag of any pre-determined thickness. The speed of the chains and the thickness of the layer of slag being so related to each other that the slag will be completely solidified by the time it reaches the upper and discharge end of the apparatus. If it is found desirable, the cooling may be accelerated by spraying water upon the surface of the slag as it moves toward the delivery end of the apparatus, as the heat of the slag might possibly prove too great for the cars into which it is discharged. The reservoir E is also provided with a trap door in the bottom, which door can be opened when the apparatus is not in use, and the cleanings fall directly upon the chain band and be discharged along with the rest of the slag.

When molten slag is brought in contact with water, it immediately bubbles and foams up and forms a light cellular structure, and therefore, if a solid product is desired, it is not well to apply the spray of water upon the outer surface of slag which is being conveyed, until it has cooled sufficiently and formed a crust to prevent this bubbling. In the modified form, Fig. 4, advantage is taken of this property of the slag; and it is utilized for the purpose of forming a protective covering to protect the chains from the hot slag. In this modified form plate N, which completely covers the lever end of the chain band is substituted for the hopper D', the plate being placed close to the chain band at the lower end; but rises slightly toward its right hand end, so as to afford more clearance above the chain. The water supply pipe O with branches P which are regulated by appropriate valves, pierces the plate and furnishes means by which the chain band is kept thoroughly chilled and wet. The chain emerges from beneath the plate N in this condition, receiving the molten slag flowing from the receptacle E, and as the molten slag strikes the wet chains, it instantly foams up and forms a protecting layer over which the molten slag will spread in a sheet of any pre-determined thickness, which can easily be regulated by means of the speed of the chains and the actuation of the levers H. As the general slope of the chains is toward the plate N, the molten slag will continually enter the space between the top of the chain and the plate N, and being instantly chilled will form a continuous porous layer equal in thickness to the distance of the plate above the chains, and in that manner the chains will be thoroughly protected from the excessive heat of the superposed layer of molten slag.

The mechanism shown in Fig. 5 is simply an elaboration of the part shown at the right hand end of Fig. 2 and does not need to be further described as any form of motor may be used and the motion can be imparted to the chain by means of gears as shown.

One feature of this device to which special attention is called is in the alinement of the trough. This trough is constructed as will be seen in Fig. 2 on a curve conforming to a catenary which catenary is calculated so that the pull exerted by the drum A will tend to raise the chains with their load from the bottom of the trough along its entire length; and in this manner the friction, and consequently, the power required to operate the machine will be considerably reduced. Also the wear and tear on the parts will be reduced as the form of the trough, conforming as it will to the curvature of the chains will only support a portion of the load on the chains throughout its entire length, which in consequence results in a minimum of frictional pressure upon the trough from the chains, and hence the resistance will be proportionately diminished.

Without enumerating the many modifications of which this invention is capable, and without limiting myself to the special form of device herein shown, what I claim and desire to obtain protection for by Letters Patent is the following:

1. In a machine adapted to convey blast furnace slag the combination of a supporting frame, drums mounted thereon on either end, and adapted to carry and actuate a plurality of endless chains, chains passing over said drums extending the length of said frame, a trough upon said frame adapted to hold the upper strands of said chains, means for actuating one of said drums, and manually controlled means for flowing molten slag upon the upper surface of said chains substantially as set forth and described.

2. A slag conveying machine consisting of a trough and two drums supported by a framework, a chain band traveling through said trough and over said drums, means for driving said drums, a reservoir placed over the lower end of said trough, means for conveying the slag from the furnace to said reservoir and means for regulating the flow of the molten slag on to the said chain band as described substantially as set forth.

3. A conveying machine adapted to receive molten material and deliver said material in a solidified form comprising an endless conveying band, means for driving and supporting said band, means for delivering molten material on said band, and means adapted to receive a heat resisting material and gravitate said material substantially evenly over the upper surface of the band and before the molten material is gravitated on said band.

4. In a mechanism adapted to convey molten material, a supporting frame, the upper members of which are alined in a catenary curve, a drum and actuating mechanism therefor at one end of said frame, a drum at the other end of said frame, a receptacle located adjacent to the second said drum, a runner discharging into said receptacle, a plurality of endless chains passing over said drums, a trough on the upper side of said frame adapted to support said chains, means, manually controlled, for allowing the contents of said receptacle to flow over the surface of said chains and means for discharging the material at the upper end of said chains, substantially as set forth.

5. In a mechanism adapted to convey molten material, a supporting frame, the upper members of which are alined in a catenary curve, a drum and actuating mechanism therefor at one end of said frame, a drum at the other end of said frame, a receptacle located adjacent to the second said drum, a runner discharging into said receptacle, and means beside said receptacle adapted to coat said chain with a heat resisting material.

6. In a mechanism adapted to convey molten material, a supporting frame, the upper members of which are alined in a catenary curve, a drum and actuating mechanism therefor at one end of said frame, a drum at the other end of said frame, a receptacle located adjacent to the second said drum, a runner discharging into said receptacle, a plate located at the lower end of said frame and above said chains and means for spraying water on said chains under said plate before the molten material comes in contact with the said chains.

7. In a machine for conveying material consisting of a conveying band passing over two drums, a trough supported between said drums, the bottom of said trough having a longitudinal curvature conforming to or approximating a catenary, mechanism for driving said drums, and means for regulating the flow of material onto said conveying band in the manner described and for the purpose set forth.

8. In a slag conveying machine consisting of a supporting frame carrying a trough, a reservoir from which the slag is delivered into said trough, means for conveying the slag from the receiving to the delivery end, and means for uniformly depositing by gravity in said trough a coating of heat resisting material before the slag is deposited therein to protect the conveyer from the excessive heat of the molten slag.

Signed this 25" day of June 1908 at New York, N. Y.

EDWARD A. UEHLING.

Witnesses:
CARRIE L. HIDDINK,
JENNIE H. BOYLE.